United States Patent
Rossi

(10) Patent No.: US 7,139,846 B1
(45) Date of Patent: Nov. 21, 2006

(54) COMPUTER SYSTEM AND METHOD FOR PERFORMING LOW IMPACT BACKUP OPERATIONS

(75) Inventor: Robert P. Rossi, Altamonte Springs, FL (US)

(73) Assignee: Veritas Operating Corporation, Cupertino, CA (US)

( * ) Notice: Subject to any disclaimer, the term of this patent is extended or adjusted under 35 U.S.C. 154(b) by 277 days.

(21) Appl. No.: 10/675,093

(22) Filed: Sep. 30, 2003

(51) Int. Cl.
*G06F 3/00* (2006.01)
*G06F 3/06* (2006.01)
*G06F 13/00* (2006.01)
*G06F 13/362* (2006.01)

(52) U.S. Cl. ............... 710/6; 710/18; 710/29; 710/58; 710/117

(58) Field of Classification Search .............. 710/6, 710/18, 29, 58–60, 117, 124
See application file for complete search history.

(56) References Cited

U.S. PATENT DOCUMENTS

| | | | |
|---|---|---|---|
| 4,736,318 A * | 4/1988 | Delyani et al. ............. 718/103 |
| 5,826,236 A * | 10/1998 | Narimatsu et al. ............. 705/8 |
| 5,953,729 A * | 9/1999 | Cabrera et al. ............. 707/204 |
| 6,101,585 A | 8/2000 | Brown et al. |
| 6,526,434 B1 | 2/2003 | Carlson et al. |
| 6,615,244 B1 * | 9/2003 | Singhal ..................... 709/213 |
| 6,665,815 B1 | 12/2003 | Goldstein et al. |
| 6,687,765 B1 * | 2/2004 | Surugucchi et al. .......... 710/15 |
| 6,701,450 B1 | 3/2004 | Gold et al. |
| 6,829,688 B1 | 12/2004 | Grubbs et al. |
| 6,847,983 B1 | 1/2005 | Somalwar et al. |
| 6,880,051 B1 | 4/2005 | Timpanaro-Perrotta |
| 6,898,667 B1 * | 5/2005 | Umberger et al. .......... 711/114 |
| 6,912,635 B1 * | 6/2005 | Patterson et al. ........... 711/165 |
| 7,035,808 B1 * | 4/2006 | Ford ............................ 705/7 |
| 2003/0145248 A1 | 7/2003 | McNeil |
| 2003/0163493 A1 | 8/2003 | Burns et al. |
| 2003/0177149 A1 | 9/2003 | Coombs |
| 2004/0030852 A1 | 2/2004 | Coombs et al. |
| 2004/0098423 A1 * | 5/2004 | Chigusa et al. ............. 707/204 |
| 2004/0143569 A1 * | 7/2004 | Gross et al. .................. 707/3 |

OTHER PUBLICATIONS

"VERITAS NetBackup™ ServerFree Agent for Oracle; Version 4.0V", VERITAS Software Corporation, Mountain View, CA, 2001.
"VERITAS NetBackup™ ServerFree Agent; Version 4.0V", VERITAS Software Corporation, Mountain View, CA, 2001.

* cited by examiner

*Primary Examiner*—Kim Huynh
*Assistant Examiner*—Joshua D. Schneider
(74) *Attorney, Agent, or Firm*—Meyertons Hood Kivlin Kowert & Goetzel, P.C.; B. Noël Kivlin

(57) ABSTRACT

A system and method for low impact backup. In one embodiment, a method may comprise monitoring utilization of a system resource and a data management process selectively performing I/O operations dependent upon the monitored utilization of the system resource. The data management process may include functionality to backup desired data from a storage medium to a backup medium. In one particular implementation, the I/O operations may be allowed to be performed in response to the utilization of the system resource falling below a predetermined threshold. In another embodiment a method may comprise performing a plurality of I/O operations to complete a data management process executed by an application. The application separates said plurality of I/O operations with intermittent delays to achieve time-slicing of the data management process with respect to one or more other applications.

25 Claims, 3 Drawing Sheets

COMPUTER SYSTEM AND METHOD FOR PERFORMING LOW IMPACT BACKUP OPERATIONS

BACKGROUND OF THE INVENTION

1. Field of the Invention

This invention relates to the field of computer processing and, more particularly, to the performance of data management processes such as backup operations on computer systems.

2. Description of the Related Art

As computers become more integral to modern business and industry, maintaining constant availability and maximizing responsiveness assumes a greater importance. A trend is developing whereby computer systems that have traditionally been used primarily during only a portion of each day, such as business hours, may now be in high demand throughout the day and night, everyday (so-called 24×7). Furthermore, it may be difficult to predict in advance when system demand may be high or low.

Various data management tasks, such as data backup, virus detection, and search indexing, have traditionally been scheduled late at night or on weekends to minimize interference with user applications. However, due to the increased demand for computer system resources during previously "off-peak" hours, it has become more difficult to reliably schedule these data management tasks when demand is low.

Furthermore, since many data management tasks are designed to complete their desired operations very quickly, they may consume large amounts of system resources during the time they are running. The performance of other applications may thus be negatively impacted if they are concurrently run with the data management tasks. For example, many data backup applications are designed to minimize the length of time a backup operation requires by transferring data to a backup medium at very high transfer rates. However, the I/O bandwidth consumed by such operations may noticeably interfere with other applications that also require I/O access at the same time.

As illustrated in FIG. 1, for example, a backup session associated with a backup application may be scheduled to execute once a day, at the same time every day. Resource utilization due to the scheduled backup sessions is illustrated by the solid line. As depicted by the dashed line, resource utilization by one or more user applications may fluctuate gradually over time. Unfortunately, as the figure also illustrates, the backup session may be scheduled at times when demand for the I/O resources by the user applications is also high. This may therefore result in decreased performance from the user's perspective.

SUMMARY OF THE INVENTION

Various embodiments of a system and method for low impact backup are disclosed. In one embodiment, a method may comprise monitoring utilization of a system resource and a data management process selectively performing I/O operations dependent upon the monitored utilization of the system resource. The data management process may include functionality to backup desired data from a storage medium to a backup medium. In one particular implementation, the I/O operations may be allowed to be performed in response to the utilization of the system resource falling below a predetermined threshold.

In another embodiment a method may comprise performing a plurality of I/O operations to complete a data management process executed by an application. The application separates said plurality of I/O operations with intermittent delays to achieve time-slicing of the data management process with respect to one or more other applications.

Figure 1:
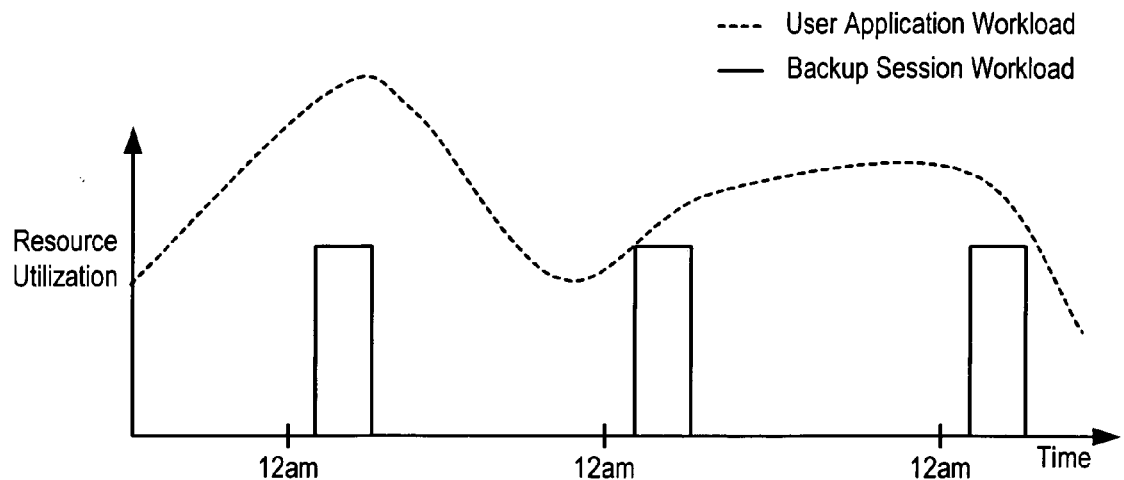
FIG. 1 is a graph illustrating I/O resource demands due to user application workload and backup session workload.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 2:
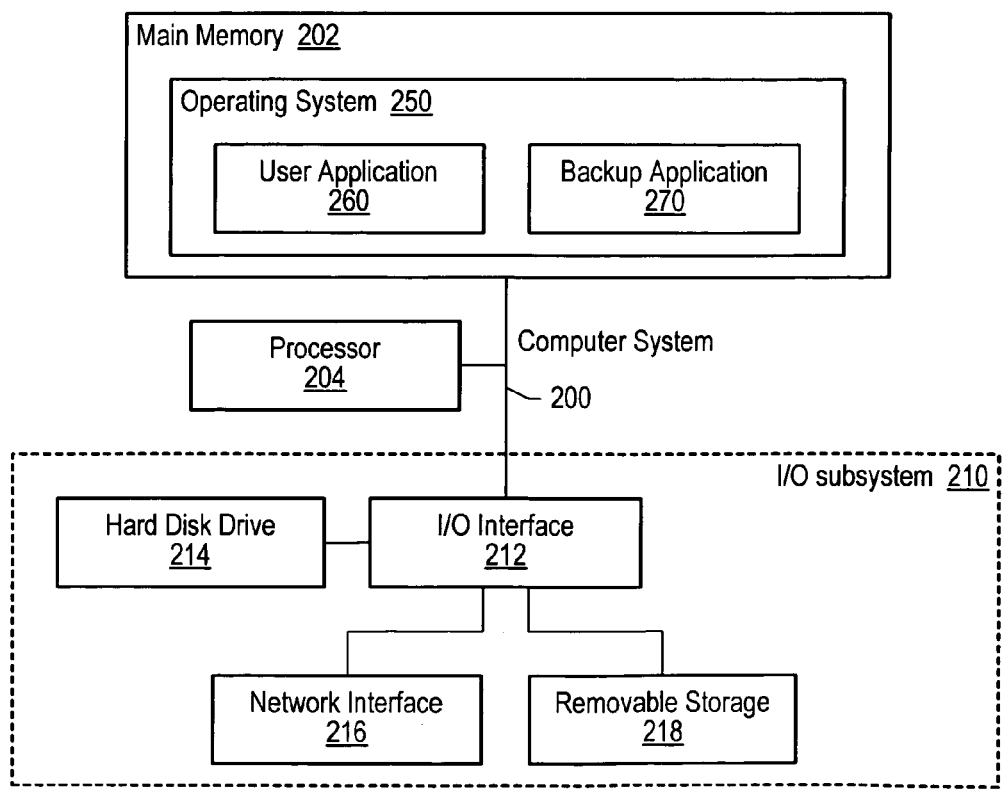
FIG. 2 is a block diagram of one embodiment of a computer system.

Turning now to FIG. 2, a block diagram of one embodiment of a computer system 200 is shown. Computer system 200 includes a processor 204 coupled to a main memory 202. Processor 204 and main memory 202 are in turn connected to an I/O subsystem 210, which comprises an I/O interface 212, a hard disk drive 214, a network interface 216, and a removable storage 218. It is noted that computer system 200 may be representative of a laptop, desktop, server, workstation, terminal, personal digital assistant (PDA) or any other type of computer system.

Processor 204 is representative of any of various types of processors such as an x86 processor, a PowerPC processor or a SPARC processor. Similarly, main memory 202 is representative of any of various types of memory, including DRAM, SRAM, EDO RAM, Rambus RAM, etc.

I/O interface 212 is operational to transfer data between processor 204 and/or main memory 202 and one or more internal or external components such as hard disk drive 214, network interface 216 and removable storage 218, as desired. For example, I/O interface 212 may embody a PCI bridge operable to transfer data from processor 204 and/or main memory 202 to one or more PCI devices. I/O interface 212 may additionally or alternatively provide an interface to devices of other types, such as SCSI devices and/or Fibre channel devices.

Hard disk drive 214 may be a non-volatile memory such as a magnetic media. Network interface 216 may be any type of network adapter, such as Ethernet, fiber optic, or coaxial adapters. Removable storage 218 is representative of a disk drive, optical media drive, tape drive, or other type of storage media, as desired.

In addition to the various depicted hardware components, computer system 200 may additionally include various software components. For example, FIG. 2 illustrates an operating system 250 and one or more user applications 260 stored in main memory 202. Operating system 250 is representative of any of a variety of specific operating systems, such as, for example, Microsoft Windows, Linux, or Sun Solaris. As such, operating system 250 may be operable to provide various services to the end user and provide a software framework operable to support the one or more user applications 260. The one or more user applications 260 are representative of any software programs which may be executable on computer system 200.

A backup application 270 is also shown stored in main memory 202. Backup application 270 may be operable to create a backup copy of selected data from storage such as hard disk drive 214 to a backup medium such as removable storage 218. Alternatively, selected data may be transferred from hard disk drive 214 to network interface 216 for transmission to and backup in a remote system.

As will be described in further detail below, backup application 270 may be configured to implement various low impact backup methods. In one embodiment, backup application 270 may be operable to control the execution of a backup session dependent on the utilization of I/O bandwidth or another monitored system resource(s). In another embodiment, backup application 270 may be operable to time slice a backup session into separate execution periods to minimize the impact on one or more user applications 260 which may be running concurrently.

Figure 3:
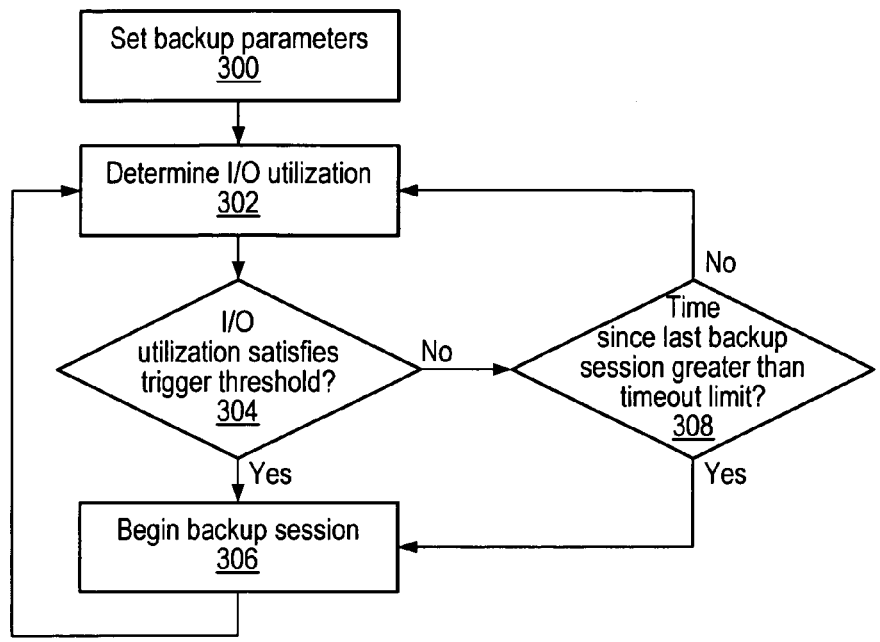
FIG. 3 is a flowchart illustrating one embodiment of a method for low impact backup.

FIG. 3 is a flowchart illustrating one embodiment of a low impact backup method. Referring collectively to FIGS. 2 and 3, in 300, a user may set a series of parameters that control various aspects of the method, as described below. In 302, backup application 270 monitors the utilization of I/O subsystem 210 (directly or indirectly) which may be a result of execution of the one or more user applications 260 (or due to other consumers of I/O subsystem 210). More particularly, in one embodiment backup application 270 may determine the amount of bandwidth being consumed in relation to the interfaces between I/O interface 212 and hard disk drive 214, network interface 216 and/or removable storage 218. It is noted that in other embodiments, other aspects associated with the utilization of I/O subsystem 210 may be additionally or alternatively monitored, such as the number, type, and/or size of I/O requests being provided to I/O interface 212 during a selected period of time.

The specific manner in which resource utilization is monitored in step 302 may vary depending upon the particular embodiment and the specific resource being monitored. For example, in one embodiment backup application 270 may access a utility provided by operating system 250 that functions to provide an indicator of utilization of a monitored resource, such as I/O subsystem 210. Alternatively, backup application 270 may be operable to directly query hardware in computer system 200, or to query drivers associated with such hardware. In yet another embodiment, backup application 270 may be operable to interact with a hardware monitor that monitors usage of a system resource.

In 304, backup application 270 determines whether the I/O utilization as determined in step 302 satisfies a trigger threshold. In one particular implementation, the trigger threshold may be specified by one or more of the parameters set in step 300. For example, the trigger threshold may be set by a user such that it is satisfied when the utilization of the total possible bandwidth between hard disk drive 214 and removable storage 218 falls below a certain percentage.

If in step 304 it is determined that the trigger threshold has been satisfied, backup application 270 executes a backup session in step 306. The backup session may include backing up of the entire contents or selected contents of hard disk drive 214 (or other storage device), as desired. It is noted that by executing a backup session when the I/O utilization (e.g. bandwidth utilization of hard disk drive 214 and/or removable media 218) is relatively low, the performance impact on user applications 260, which may be running concurrently, may be negligible.

If in step 304 it is instead determined that the trigger threshold has not been satisfied, backup application 270 may determine in step 308 the amount of time which has elapsed since the last backup session was performed. If the time since the last backup session is less than a predetermined interval, backup application 270 may return to step 302. It is noted that in this embodiment the trigger threshold will not be satisfied when utilization of the I/O subsystem 210 is relatively high, which may be the result of operations invoked by user applications 260. Since backup operations in step 306 are not performed in this situation, further loading of system resources such as I/O subsystem 210 may be avoided, and application performance from a user's perspective may be improved.

If the time since the last backup session in step 308 is greater than the predetermined interval, backup application 270 may instead advance to step 306, in which a backup session is executed. In this manner, the time between successive backup sessions may be guaranteed to not exceed the predetermined interval, regardless of whether I/O conditions are favorable or not. Such functionality may be desirable to ensure that data is backed up with at least some frequency. It is noted that in one particular implementation, the predetermined interval may be specified by one or more of the parameters set in step 300. It is also noted that in alternate embodiments, the operations of step 308 may be omitted in such a way that a backup session may be invoked only if the trigger threshold in step 304 is satisfied (i.e., if resource utilization is relatively low).

In a further implementation of the low impact backup method illustrated by FIG. 3, a set amount of time may be required to elapse (following initiation or completion of a given backup session) before another backup session can be initiated in step 306. This may thus prevent consecutive backup sessions from being triggered too frequently.

In addition, in a further implementation of the low impact backup method illustrated by FIG. 3, the I/O utilization (or other system resource utilization) as determined in step 302 may be required to satisfy a given threshold for at least a given period of time before a backup session will be invoked in step 306. Inclusion of such functionality may thus avoid initiating a backup session in response to short sporadic breaks in system demand.

It is noted that, in various alternative embodiments, backup application 270 may monitor other system resources, such as the usage of processor 204, to determine if a trigger threshold has been satisfied. In addition, any various combinations of monitored resources may be used to determine if a trigger threshold has been satisfied.

Still further, in yet an additional alternate embodiment, various aspects associated with the utilization of I/O subsystem 210 (or other system resources) may be monitored and weighted differently (or prioritized) in step 304 to determine whether a trigger threshold has been satisfied. For example, write activity to hard disk drive 214 may be much more important than read activity in limiting a backup session. Thus, the bandwidth consumed by write activity may be given a higher weighting when calculating if the trigger threshold has been satisfied.

It is also noted that, in various embodiments, the parameters set in step 300 may further control, for example, which system resource or combination of resources may be monitored in step 302, how those resources will be weighted in relation to each other, and how long system resources must remain below threshold levels for the trigger threshold to be satisfied.

Figure 4:
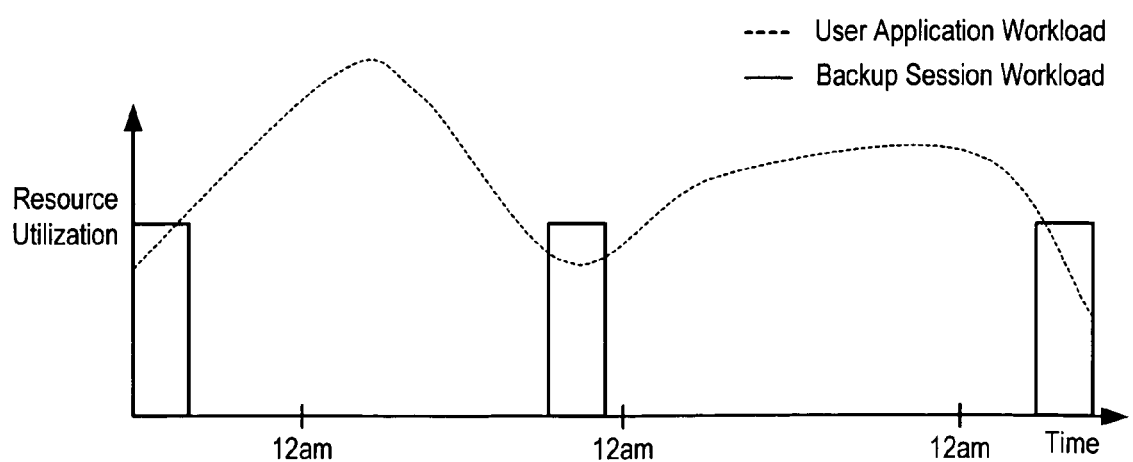
FIG. 4 is a graph illustrating exemplary I/O resource demand due to user application workload and backup session workload as a result of an implementation of the low impact backup method of FIG. 3.

FIG. 4 is a graph illustrating an exemplary result which may be attained through implementation of the low impact backup method of FIG. 3. Comparing FIG. 4 to FIG. 1, the same demand for I/O bandwidth by user applications 260 (as shown by the dashed line) may be presented to the system. However, in FIG. 4 the low impact backup method of FIG. 3 triggers backup sessions such that they are performed when user demand is relatively low, thereby minimizing the interference between backup operations and user application workload.

While in the embodiments described above the functionality of FIG. 3 is implemented by a backup application, other embodiments are possible. For example, in one alternative embodiment, the low impact backup method of FIG. 3 may be carried out by functionality within operating system 250 as part of a backup utility.

Figure 5:
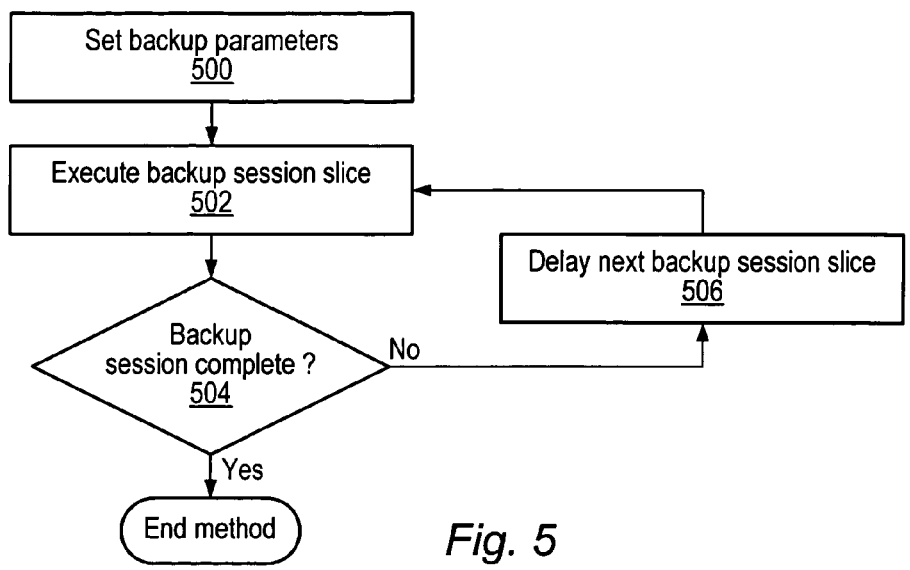
FIG. 5 is a flowchart illustrating another embodiment of a method for low impact backup.

FIG. 5 is a flowchart illustrating an alternative embodiment of a low impact backup method. As will be described below, FIG. 5 illustrates a method in which a backup session is carried out by time slicing, i.e. using backup application 270 to control the execution of a backup session such that data is backed up intermittently over a period of time. By intermittently backing up data associated with a backup session, interference with user applications which may be running concurrently may be less noticeable to a user.

As illustrated in FIG. 5, in step 500, a user may set a series of parameters that control various aspects of the method, as will be described below. In 502, backup application 270 executes a first backup session slice. A backup session slice is a portion of a backup session which is separated from other backup session slices by an intermittent time delay. In one embodiment, a backup session slice may be specified by the amount of data transferred between time delays. For example, 512 kilobytes of data may be transferred to a backup medium every 500 milliseconds. In another embodiment, a backup session slice may be specified by a length in time during which I/O operations for backup are performed. For example, a computer may perform backup activity for 500 milliseconds, and then wait another 1500 milliseconds to perform another backup session slice. These parameters may be set in step 500, as described above.

In 504 backup application 270 determines if the backup session is complete, i.e. if the last slice of the backup session has been backed up to a backup medium such as removable storage 218. If the backup session is complete, the method ends. Alternatively, if the backup session is incomplete, backup application 27 advances to step 506, wherein backup application 270 delays execution of I/O operations associated with the next backup session slice for an intermittent delay value. In one embodiment, the intermittent delay value may be set by the user in step 500. Backup application 270 may then return to step 502.

Figure 6:
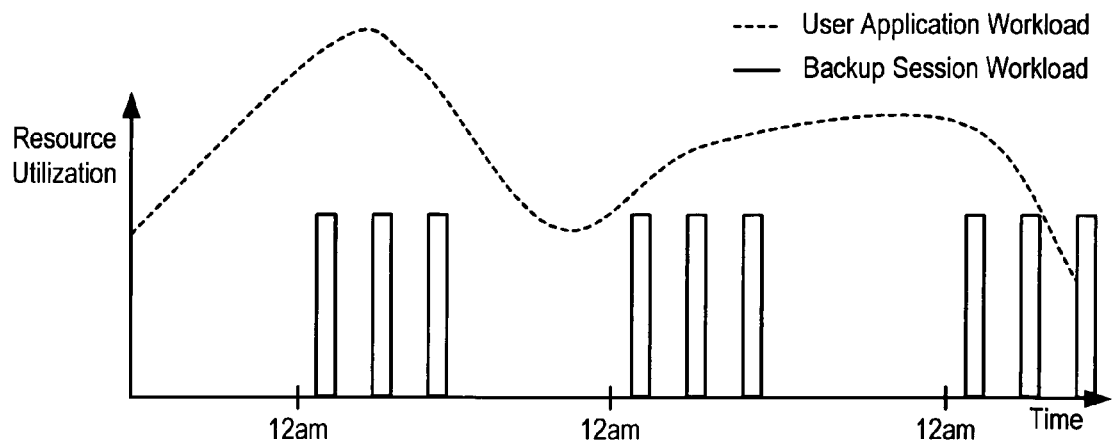
FIG. 6 is a graph illustrating exemplary I/O resource demand due to user application workload and backup session workload as a result of an implementation of the low impact backup method of FIG. 5.

FIG. 6 is a graph illustrating an exemplary result which may be attained through implementation of the low impact backup method of FIG. 5. Comparing FIG. 6 to FIG. 1, the same demand for I/O bandwidth by user applications 260 (as shown by the dashed line) may be presented to the system. However, in FIG. 6 the low impact backup method of FIG. 5 time slices I/O operations associated with each backup session such that they are staggered over a period of time. It is noted that by time slicing a backup session, the impact of the backup operations on user applications 260 which may be running concurrently may be reduced.

In another embodiment of the embodiment described in FIG. 5, the intermittent delay provided in step 506 between backup session slices may be varied depending upon a utilization of a monitored system resource such as I/O subsystem 210, as described in step 302 of FIG. 3. In such an embodiment, backup session slices may be clustered closer together when demand for system resources is low, and spread further apart as demand for system resources is high.

It is noted that various alternate embodiments may combine the operations of FIGS. 3 and 5 in a variety of ways. For example, the resource demand monitoring methodology of FIG. 3 might be combined with the time-slicing methodology of FIG. 5. In one such embodiment, each backup session is triggered according to demand for system resources, such as I/O subsystem 210. Once triggered, the backup session would then be time-sliced, in effect executing steps 502, 504 and 506 of FIG. 5 during step 306 of FIG. 3. This embodiment may thereby further minimize interference between the backup session and user applications 260. It is noted that such an embodiment may result in triggering a backup session when the demand for system resources is low, and in further distributing the impact of a backup session across a period of time.

Figure 7:
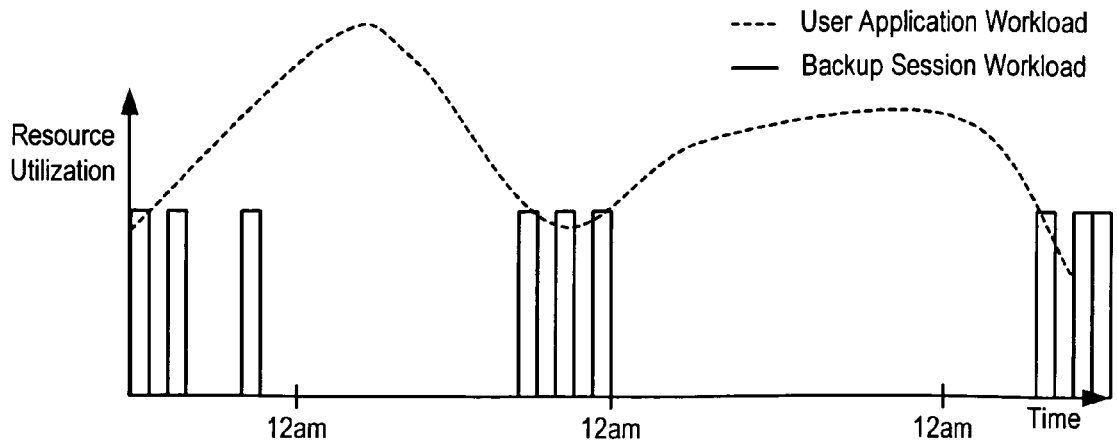
FIG. 7 is a graph illustrating exemplary I/O resource demand due to user application workload and data management task workload as a result of another implementation of a low impact backup method.

In a further implementation of the embodiment described above, the delay provided between execution of backup session slices may be varied according to a utilization of a monitored system resource such as I/O subsystem 210. FIG. 7 is a graph illustrating an exemplary result which may be attained through implementing such an embodiment. Accordingly, backup session slices may be both triggered and clustered together when demand for system resources is low, and spread apart when demand is high, thereby providing an optimal utilization of otherwise unused resources and minimizing interference with user applications.

It is further contemplated that, in various alternative embodiments of the low impact backup methods described above, historical information may be used to control the performance of the backup sessions and/or backup backup session slices. The historical information may include, for example, information indicative of a prior history of resource utilization within the computer system and/or a prior history of the performance of backup sessions and/or backup session slices. Based upon the historical information, one or more of the parameters as discussed in the above embodiments (e.g., the trigger threshold level, how long system resources must remain below threshold levels for a trigger to be satisfied, which system resources are used determine whether a trigger threshold has been satisfied, and/or the clustering of backup session slices) may be automatically tuned. In alternative embodiments, future backup sessions may be controlled based upon the historical information.

For example, in one embodiment, the low impact backup method may be configured to determine from the historical information that backup sessions and/or backup session slices have not been invoked as often as desired, or that a trigger threshold has not been satisfied as frequently as desired. Accordingly, in response to such a determination, the low impact backup method may automatically lower the trigger threshold. In another embodiment, the low impact backup method may be configured to determine from the historical information that utilization of a monitored system resource is typically relatively low at a particular time of a day (or of multiple days). In response to such a determination, the low impact backup method may automatically invoke a backup session at the particular time on a subsequent day.

It is noted that in other embodiments, rather than performing I/O operations associated with a backup application in steps 306 and/or 502, I/O operations to perform other types of data management tasks may be performed. For example, I/O operations associated with data management tasks such as virus scanning or search indexing may be triggered according to monitored system resources or time sliced to minimize the impact of such data management tasks on user applications 260.

It is noted that any of the embodiments described above may further include receiving, sending or storing instructions and/or data that implement the operations described above in conjunction with FIGS. 3–7 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   monitoring one or more system resources to obtain values of a plurality of metrics, including a first metric and a second metric;
   a data management process performing one or more I/O operations dependent upon the plurality of metrics, wherein said performing includes determining a scheduling of at least one I/O operation of the one or more I/O operations using a specified weight assigned to the first metric relative to the second metric; and
   obtaining user-specified values of one or more parameters to schedule the one or more I/O operations, including a particular parameter specifying the relative weight assigned to the particular metric,
   wherein the one or more parameters include a parameter specifying a length of a delay between at least two successive periods of a sequence of periods of I/O activity of the data management process.

2. The method of claim 1 wherein said data management process is executed as a portion of a data backup application.

3. The method of claim 1 wherein the plurality of metrics includes a utilization of a system resource of the one or more system resources, wherein performing the one or more I/O operations includes:
   allowing said one or more I/O operations to be performed in response to the utilization of the system resource falling below a threshold indicated by a user-specified parameter; and
   preventing said one or more I/O operations from being performed in response to the utilization of the system resource exceeding the predetermined threshold.

4. The method of claim 3 wherein said one or more I/O operations are performed in response to the utilization of the system resource falling below a predetermined threshold for at least a predetermined amount of time.

5. The method of claim 3 wherein performing the one or more I/O operations further includes allowing said one or more I/O operations to be performed in response to said one or more I/O operations not having been performed for longer than a predetermined timeout period.

6. The method of claim 1 wherein the one or more system resources include an input/output (I/O) subsystem.

7. The method of claim 1 further comprising selectively time slicing said one or more I/O operations dependent upon at least one metric of the plurality of metrics.

8. The method of claim 1, wherein the one or more system resources include a first system resource and a second system resource, wherein the first metric includes a utilization of the first system resource and the second metric includes a utilization of the second system resource.

9. The method of claim 1, wherein the first metric is indicative of a level of a first type of activity at a particular system resource of the one or more system resources and the second metric is indicative of a level of a second type of activity at the particular system resource.

10. The method of claim 9, wherein the particular system resource comprises a storage device, wherein the first type of activity comprises write operations, and wherein the second type of activity type comprises read operations.

11. The method of claim 1, wherein the one or more parameters include an identification of the one or more system resources.

12. The method of claim 1, further comprising:
    automatically tuning at least one parameter of the one or more parameters based at least in part on historical information associated with one or more metrics of the plurality of metrics.

13. The method of claim 1, wherein the one or more parameters include a parameter specifying an amount of data to be transferred by the data management process in each period of I/O activity of a sequence of periods of I/O activity.

14. The method of claim 1, wherein a plurality of periods of I/O activity of the sequence correspond to a single backup operation, further comprising dynamically modifying the length of the delay while the single backup operation is in progress in response to a change in a value of a metric of the plurality of metrics.

15. A system comprising at least one processor and a memory coupled to the processor, wherein the memory includes program instructions executable to:
    monitor one or more system resources to obtain values of a plurality of metrics, including a first metric and a second metric;
    execute a data management process performing one or more I/O operations dependent upon the plurality of metrics, wherein said performing includes determining a scheduling of at least one I/O operation of the one or more I/O operations using a specified weight assigned to the first metric relative to the second metric; and
    obtain user-specified values of one or more parameters to schedule the one or more I/O operations, including a particular parameter specifying the relative weight assigned to the particular metric, wherein the one or more parameters include a parameter specifying a length of a delay between at least two successive periods of a sequence of periods of I/O activity of the data management process.

16. The system of claim 15 wherein said data management process is executed as a portion of a data backup application.

17. The system of claim 15 wherein the plurality of metrics include a utilization of a system resource of the one or more system resources, wherein performing the one or more I/O operations includes program instructions executable to:

allow said one or more I/O operations to be performed in response to the utilization of the system resource falling below a threshold indicated by a user-specified parameter; and prevent said one or more I/O operations from being performed in response to the utilization of the system resource exceeding the threshold.

18. The system of claim 17 wherein said one or more I/O operations are performed in response to the utilization of the system resource falling below a predetermined threshold for at least a predetermined amount of time.

19. The system of claim 17 wherein performing the one or more I/O operations further includes program instructions executable to:

allow said one or more I/O operations to be performed in response to said one or more I/O operations not having been performed for longer than a predetermined timeout period.

20. The system of claim 15 wherein the one or more system resources include an input/output (I/O) subsystem.

21. The system of claim 15 wherein the one or more system resources include one or more central processing units (CPUs).

22. The system of claim 15 further comprising program instructions executable to:

selectively time slice said one or more I/O operations dependent upon at least one metric of the one or more metrics.

23. A computer readable storage medium including program instructions computer-executable to:

monitor one or more system resources to obtain values of a plurality of metrics, including a first metric and a second metric;

execute a data management process performing one or more I/O operations dependent upon the plurality of metrics, wherein said performing includes determining a scheduling of at least one I/O operation of the one or more I/O operations using a specified weight assigned to the first metric relative to the second metric; and obtain user-specified values of one or more parameters to schedule the one or more I/O operations, including a particular parameter specifying the relative weight assigned to the particular metric, wherein the one or more parameters include a parameter specifying a length of a delay between at least two successive periods of a sequence of periods of I/O activity of the data management process.

24. The computer readable medium of claim 23 wherein said data management process is executed as a portion of a data backup application.

25. The computer readable medium of claim 23 wherein the plurality of metrics includes a utilization of a system resource of the one or more system resources, wherein performing the one or more I/O operations includes program instructions computer-executable to:

allow said one or more I/O operations to be performed in response to the utilization of the system resource falling below a threshold indicated by a user-specified parameter; and prevent said one or more I/O operations from being performed in response to the utilization of the system resource exceeding the threshold.

* * * * *